United States Patent
Badger, II et al.

(10) Patent No.: US 11,173,801 B2
(45) Date of Patent: Nov. 16, 2021

(54) ELECTRIC VEHICLE WITH REMOTE ADAPTIVE CHARGE PROGRAMMING USING OVERRIDE OF ON-BOARD CHARGE PROGRAMMING

(71) Applicant: Ford Global Technologies, LLC, Dearborn, MI (US)

(72) Inventors: Charles Everett Badger, II, Westland, MI (US); Jordan Firnbach, Ann Arbor, MI (US); Angel Fernando Porras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 16/588,949

(22) Filed: Sep. 30, 2019

(65) Prior Publication Data
US 2021/0094433 A1 Apr. 1, 2021

(51) Int. Cl.
*B60L 53/62* (2019.01)
*B60L 53/14* (2019.01)
*B60L 50/60* (2019.01)

(52) U.S. Cl.
CPC .............. *B60L 53/62* (2019.02); *B60L 50/60* (2019.02); *B60L 53/14* (2019.02); *B60L 2240/70* (2013.01)

(58) Field of Classification Search
CPC ............................................... B60L 53/60–68
See application file for complete search history.

(56) References Cited

U.S. PATENT DOCUMENTS

| | | | |
|---|---|---|---|
| 8,560,155 B2 | 10/2013 | Kedar-Dongarkar et al. | |
| 9,457,791 B2 | 10/2016 | Vitale et al. | |
| 9,840,156 B2 | 12/2017 | DeBoer, III | |
| 10,160,340 B2 | 12/2018 | Lindemann et al. | |
| 2008/0039989 A1* | 2/2008 | Pollack | B60L 53/57 701/22 |
| 2011/0175569 A1* | 7/2011 | Austin | B60L 53/14 320/109 |
| 2013/0103378 A1* | 4/2013 | Tinnakornsrisuphap | B60L 15/2045 703/18 |

* cited by examiner

Primary Examiner — David V Henze-Gongola
(74) Attorney, Agent, or Firm — Brooks Kushman PC; David Kelley

(57) ABSTRACT

A vehicle includes a traction battery configured to be charged from an external power source via a vehicle charger, a transceiver configured to wirelessly transmit vehicle data to an external server and to wirelessly receive adaptive traction battery charging settings from the external server, an interface module configured to selectively override control of the vehicle charger based on the adaptive traction battery charging settings wirelessly received via the transceiver from the external server, a human-machine interface (HMI), and a controller in communication with a persistent on-board vehicle memory, the vehicle charger, the override module, and the HMI, the controller configured to receive manually entered traction battery charging settings via the HMI, store the manually entered traction battery charging settings in the persistent on-board vehicle memory, and selectively control the vehicle charger using the manually entered traction battery charging settings in response to the adaptive traction battery charging settings being unavailable.

18 Claims, 2 Drawing Sheets

ELECTRIC VEHICLE WITH REMOTE ADAPTIVE CHARGE PROGRAMMING USING OVERRIDE OF ON-BOARD CHARGE PROGRAMMING

TECHNICAL FIELD

This disclosure relates to an electrified vehicle having adaptive remote programming for battery charging settings to selectively override on-board programming of battery charging settings.

BACKGROUND

Electrified vehicles such as plug-in hybrid electric vehicles (PHEVs) and battery electric vehicles (BEVs) typically include programming features to allow a user to control battery charging settings and schedules. This may include the ability to set a day/time by which the vehicle should be charged to a selected charge limit and preconditioned to predefined settings, to define days/times when the vehicle should avoid charging based on electric rates or other considerations, to specify a maximum charging, current from a portable charger, to set a charge target to limit charging below maximum battery capacity (such as when charging at the top of a hill to take advantage of regenerative braking, or other considerations), to manually override a programmed Charging schedule for immediate charging, etc. These features may be controlled by the user via an on-board human-machine interface (HMI) of the vehicle based on fixed inputs from the user.

SUMMARY

Embodiments according to the disclosure include an electrified vehicle having a traction battery configured to be charged from an external power source via a vehicle charger, a transceiver configured to wirelessly transmit vehicle data to an external server and to wirelessly receive adaptive traction battery charging settings from the external server, an interface module configured to selectively override control of the vehicle charger based on the adaptive traction battery charging settings wirelessly received via the transceiver from the external server, a human-machine interface (HMI), and a controller in communication with a persistent on-board vehicle memory, the vehicle charger, the override module, and the HMI, the controller configured to receive manually entered traction battery charging settings via the HMI, store the manually entered traction battery charging settings in the persistent on-board vehicle memory, and selectively control the vehicle charger using the manually entered traction battery charging settings in response to the adaptive traction battery charging settings being unavailable.

Embodiments may also include a method for controlling charging of an electrified vehicle having a traction battery. The method may include wirelessly receiving adaptive charging settings from an external server, receiving manually entered charging settings from a human-machine interface (HMI), storing the manually entered charging settings in a persistent memory of the electrified vehicle, and in response to detecting connection of the electrified vehicle to an external power source, controlling charging of the vehicle by a vehicle controller using the manually entered charging settings in response to the adaptive charging settings being unavailable. The method may include controlling charging of the electrified vehicle by the vehicle controller to stop charging the electrified vehicle in response to receiving a corresponding input from the HMI. The method may also include controlling charging of the electrified vehicle to override the manually entered charging settings and the adaptive charging settings and start charging in response to a corresponding input from the HMI. In one or more embodiments, the method includes varying the adaptive charging settings in response to historical charging, data and historical trip data of the electrified vehicle.

A method according to one or more embodiments of the disclosure may include transmitting charging data and trip data from the electrified vehicle to the external server. The method may also include receiving calendar data from a handheld mobile device coupled to the electrified vehicle, transmitting the calendar data from the electrified vehicle to the external server, and varying the adaptive charge settings based on the calendar data. The adaptive charge settings may include one or more of a traction battery charging target less than a maximum traction battery capacity, a schedule for charging, and charging power costs associated with charging during each of a plurality of time periods.

One or more embodiments according to the present disclosure may include a system for controlling electrified vehicle charging. The system may include a traction battery configured to be charged from an external power source via a vehicle charger, a transceiver configured to wirelessly transmit vehicle data to an external server and to wirelessly receive adaptive traction battery charging settings from the external server, an interface module configured to selectively override control of the vehicle charger based on the adaptive traction battery charging settings wirelessly received via the transceiver from the external server, a human-machine interface (HMI), a controller in communication with a persistent on-board vehicle memory, the vehicle charger, the override module, and the HMI, the controller configured to receive manually entered traction battery charging settings via the HMI, store the manually entered traction battery charging settings in the persistent on-board vehicle memory, and selectively control the vehicle charger using the manually entered traction battery charging settings in response to the adaptive traction battery charging settings being unavailable, and a server configured to receive electrified vehicle charging data and electrified vehicle trip data and to vary adaptive electrified vehicle charging settings in response thereto, and to selectively transmit the adaptive electrified vehicle charge settings to the electrified vehicle for use by the controller of the electrified vehicle to selectively control the vehicle charger.

Various embodiments may provide one or more advantages. For example, embodiments according to the disclosure facilitate adaptive charge control features that may utilize an external server to apply machine learning and/or artificial intelligence for learning driving behavior and adapting or optimizing control of battery charging settings by overriding on-board settings without impacting base vehicle performance. This facilitates development and deployment of advanced functions (such as geofencing, for example) without requiring the vehicle powertrain to be updated via a traditional software update or flash. Providing a selective override to implement an alternative charging program while not erasing or reprogramming on-board settings facilitates development of advanced features while limiting impact to the vehicle HMI.

Providing a programming override to switch to externally provided settings may also reduce the impact or effect that frequent programming changes may otherwise have on vehicle hardware because the external settings do not need to be stored in protected persistent memory of the vehicle. Vehicle charge settings are often stored in protected persistent memory of a powertrain control module so that settings are not lost when the battery is removed or a software update is performed. However, this memory is designed for a limited number of guaranteed read/write cycles based on the expected service life of the vehicle. As such, embodiments according to the disclosure may retrieve charge settings from the external system and store settings in non-persistent memory in response to one or more override triggers, such as battery/power removal or software updates, for example.

The above advantages and other advantages may be recognized by those of ordinary skill in the art based on the following detailed description of one or more embodiments.

DETAILED DESCRIPTION

Figure 1:
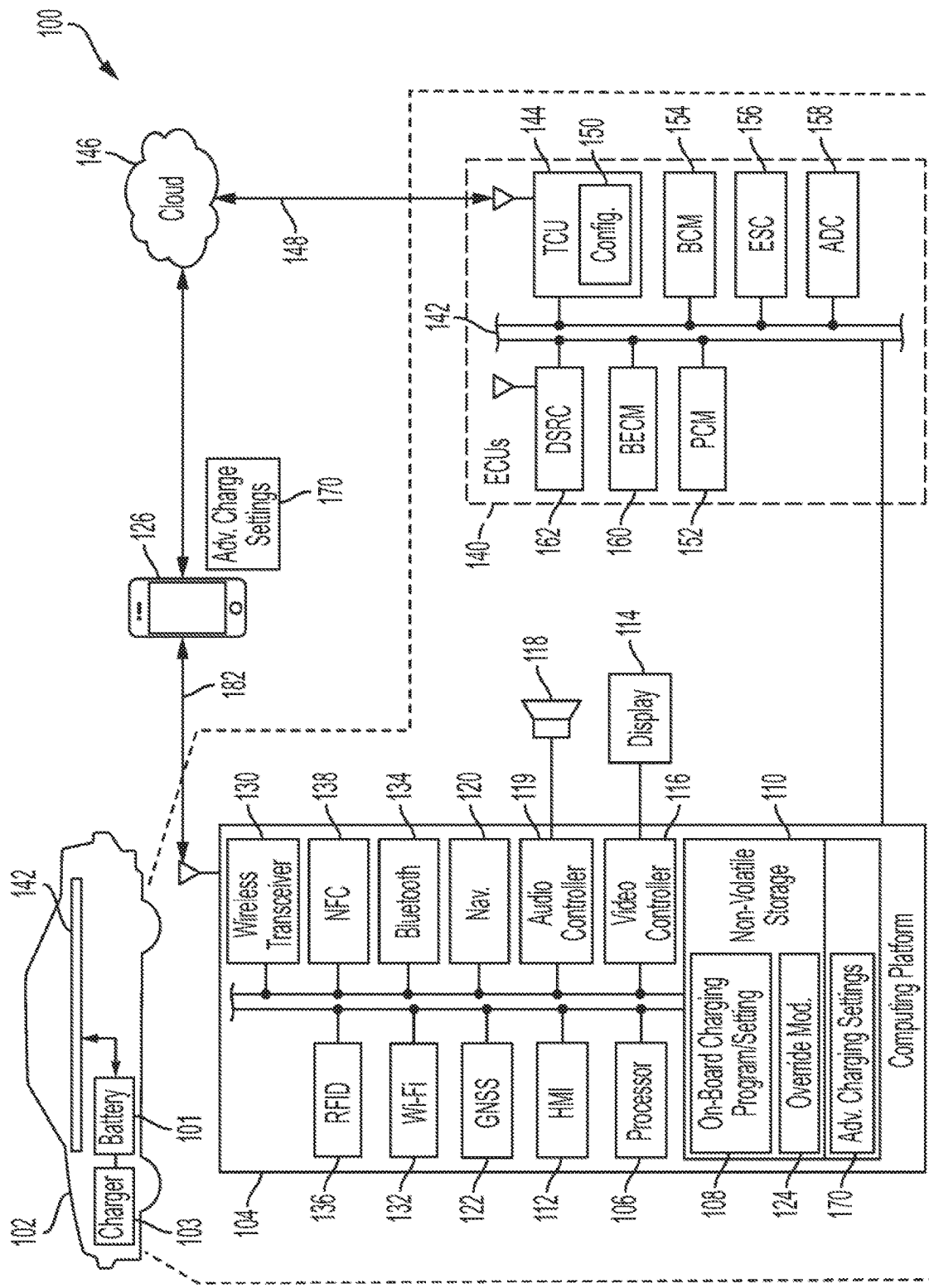
FIG. 1 is a block diagram illustrating operation of a representative system or method for overriding electrified vehicle charge settings from an external source according to one or more embodiments.

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Many electrified vehicles provide the user the ability to program battery charging schedules and some parameters. These user-programmed systems are based on the relatively fixed inputs of the user and are not adaptive. Systems that incorporate adaptive features or use machine learning or artificial intelligence require considerable resources that may not be feasible or cost-effective for a vehicle system. For example, many vehicle systems may not have the capability to store and analyze significant amounts of data to learn driving and charging behavior and adjust battery charging programs accordingly. Systems that may rely entirely on a remote server or system to adaptively or automatically control battery charging may require the user to manually enter settings if the remote system is unavailable, or if the user decides to temporarily or permanently disable the remotely controlled features.

As described in greater detail below, one or more embodiments according to the present disclosure provide a battery charging settings override that can be activated by an interface module to activate charge settings from a remote system. Use of such an override feature allows the user to set on-board charge settings using a vehicle HMI that are stored in persistent memory and used if the remote system is unavailable, or if the user desires to temporarily or permanently deactivate the advanced features. The user can activate advanced features to allow the remote system to collect and analyze data to learn vehicle driving and charging behaviors and schedules, to interface with apps (such as a calendar) and to interface with services (such as electrical/ utility companies, vehicle sharing, charge station subscriptions, etc.) and adjust the vehicle charge settings to achieve a selected goal (such as to maximize power savings, cost savings, or some other goal). The learning and adaptation system, which may use various strategies for machine leaning and artificial intelligence, is provided remotely or externally relative to the vehicle to leverage cloud data storage and processing capabilities. The present disclosure is independent of the particular processing strategies that may be used to analyze the vehicle's driving and/or charging data to determine the charge settings or programming. Charge settings or programming is provided from the external system via an override interface module that allows the external system to control vehicle charging rather than the native vehicle control module.

When the remote system or override interface is activated, the system periodically or continuously collects data transmitted by the vehicle or an associated mobile device and performs corresponding data storage and analysis to make charging decisions based on the selected goals. The override interface module may activate or deactivate the remote system in response to various override signals, such as an override toggle to turn all advanced features on/off, a charge limit for charging, an on-demand charging to immediately start/stop charging, a charge pause command to pause charging for a particular time period or until a trigger event, and a charge power limit to limit the maximum power the vehicle can draw from the grid, for example. When active, the vehicle will control charging based on settings commanded via the override interface module, if the user decides to deactivate the advanced features, or the remote system is unavailable for any reason, the vehicle reverts to the on-board manually entered charging settings.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed or configured to perform any number of the functions as disclosed.

The present disclosure describes a system and method for controlling traction battery charging of an electrified vehicle when connected to an external power source via electric vehicle supply equipment (EVSE) configured to receive power from the electric grid or other power source through a plug or wirelessly to charge a vehicle high-voltage traction battery. Vehicle charging may be controlled using adaptive charging settings received from a remote server, or using on-board charging settings manually entered by a user via an associated interface. FIG. 1 illustrates an example system 100 including an electrified vehicle 102 having a traction battery 101 and an associated battery charger 103 configured to access one or more external cloud servers and/or a mobile device to transmit vehicle charging data and trip data and to receive adaptive vehicle charging settings. The vehicle 102 generally represents various types of passenger vehicles, such as a crossover utility vehicle (CUV or XUV), a sport utility vehicle (SUV), a truck, a recreational vehicle (RV), etc. including driver operated, driver-assisted, and fully autonomous configurations for transporting people or goods. Vehicle 102 may include a computing platform 104 that provides telematics services including navigation, turn-by-turn directions, vehicle health reports, adaptive and manually entered charging settings and features, utility or charging rates, and hands-free calling, or example. In one example, vehicle 102 may include the SYNC system manufactured by The Ford Motor Company of Dearborn, Mich. It should be noted that the illustrated system 100 is merely an example, and more, fewer, and/or differently located elements may be provided.

In some embodiments, electrified vehicle 102 may be a battery electric vehicle (BEV) powered only by a high voltage traction battery 101 and one or more electric machines that may be operated as a motor/generator selectively drawing power from or charging high voltage traction battery 101. In other embodiments electrified vehicle 102 may be a hybrid electric vehicle (HEV) powered by an internal combustion engine in combination with one or more electric machines that may each operate as a motor and/or generator. For HEV embodiments, the vehicle may have various powertrain configurations including a series hybrid configuration, a parallel hybrid configuration or a parallel/series hybrid configuration, for example. Vehicle 102 may include various types of transmission or gear box configurations including a powersplit configuration, a continuously variable transmission (CVT), or a step-ratio transmission, for example. Control of vehicle charging of an electrified vehicle based on adaptive or manually entered charge settings according to the present disclosure is generally independent of the particular type of vehicle or implementation of the particular vehicle powertrain.

As illustrated in FIG. 1, a computing platform 104 may include one or more processors 106 configured to perform instructions, commands, and other routines in support of the processes, functions, or algorithms described herein. For example, the computing platform 104 may be configured to execute instructions of vehicle applications including on-board vehicle charging settings or programming 108 to provide various features as described herein including selectively wirelessly transmitting vehicle data to an external cloud server for storage and processing to determine and/or vary adaptive vehicle charging settings 170 and to wirelessly receive the adaptive vehicle charge settings. Vehicle data and charge settings may be transmitted/received from the external cloud server 146 either directly or from an associated or connected handheld mobile device 126. Instructions and other data including manually entered on-board charge programming settings 108 may be maintained in a non-volatile or persistent manner using a variety of types of computer-readable storage media 110. The computer-readable media 110 (also referred to as a processor-readable medium or storage) includes any non-transitory medium (e.g., tangible medium) that participates in providing instructions or other data that may be read or accessed by the controller or processor 106 of the computing platform 104 to control charger 103 and associated charging of traction battery 101 when connected to an external power source. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL, for example.

The computing platform 104 may be provided with various features allowing the vehicle occupants/users to interface with the computing platform 104 and to manually enter on-board charging settings for use when adaptive charge settings are unavailable or otherwise not desired. For example, the computing platform 104 may receive input from human-machine interface (HMI) controls 112 configured to provide for occupant interaction with the vehicle 102. As an example, the computing platform 104 may interface with one or more software or hardware buttons (not shown) or other HMI controls configured to invoke functions on the computing platform 104 (e.g., steering wheel audio buttons, a push-to-talk button, instrument panel controls, etc.). In one or more embodiments, HMI 112 may be used to manually enter or select vehicle charging settings including one or more of a traction battery charging target less than a maximum traction battery capacity, a schedule for traction battery charging, charging power costs associated with charging during each of a plurality of time periods, a charging on-demand input to stop charging or to start charging in response to connection to the external power source, etc. Additional settings or features that may be activated or specified using HMI 112 include allowing access or connection to calendar data, vehicle sharing data, charge station subscriptions, selection of a charging strategy goal (such as minimizing cost, maximizing range, minimizing charging time, etc.) and similar features. HMI 112 may include one or more video screens or displays to present information from various vehicle sensors to the driver/occupants, such as display 114 or a connected/coupled display of a mobile device 126.

The computing platform 104 may also drive or otherwise communicate with one or more displays 114 configured to provide visual output to vehicle occupants by way of a video controller 116. In some cases, the display 114 may be a touch screen further configured to receive user touch input via the video controller 116, while in other cases the display 114 may be a display only, without touch input capabilities. The computing platform 104 may also drive or otherwise communicate with a vehicle audio system including one or more speakers 118 configured to provide audio output to vehicle occupants by way of an audio controller 119.

The computing platform 104 may also be provided with navigation and route planning features through a navigation controller 120 configured to calculate navigation routes responsive to user input via e.g., the HMI controls 112, and output planned routes and instructions via the speaker 118 and the display 114. Route planning or actual route/trip data as well as planned and/or actual vehicle charging data may be selectively transmitted to an external cloud server 146 for use in varying adaptive charge settings based on a selected goal. Location data that is utilized for navigation or to determine trip data or charging location may be collected from a global navigation satellite system (GNSS) controller 122 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and the like. Map data used for route planning may be stored in the storage 110 as a part of the vehicle data. Navigation software may be stored in the storage 110. Alternatively, navigation software and configuration data (e.g. preferences, saved addresses or the like) may be stored individually within the navigation controller 120 provided with non-volatile storage medium (not shown).

The computing platform 104 may be configured to wirelessly communicate with a mobile device 126 of the vehicle users/occupants via a wireless connection 128 through a wireless transceiver 130. The mobile device 126 may be any of various types of portable computing device, such as cellular phones, tablet computers, smart watches, laptop computers, portable music players, or other device having a processor coupled to a memory and configured for communication with the computing platform 104 to communicate vehicle data to the external cloud server 146 and to receive adaptive charge settings from the external cloud server 146 and communicate the adaptive charge settings to the computing platform 104. Alternatively, vehicle computing platform 104 may directly wirelessly communicate with the external cloud server 146 via an associated transceiver 130. The wireless transceiver 130 may be in communication with a Wi-Fi controller 132, a Bluetooth controller 134, a radio-frequency identification (RFID) controller 136, a near-field communication (NFC) controller 138, and other controllers such as a Zigbee transceiver and/or an IrDA transceiver (not shown), and configured to communicate with a compatible wireless transceiver of the mobile device 126.

The computing platform 104 may be further configured to communicate with vehicle controllers that may include various electronic control modules or units (ECUs) 140 via one or more in-vehicle networks 142. The in-vehicle network 142 may include, but is not limited to, one or more of a controller area network (CAN), an Ethernet network, and a media-oriented system transport (MOST), as some examples.

ECUs 140 may include a telematics control unit (TCU) 144 configured to control telecommunication between vehicle 102 and external cloud server 146 through a wireless connection 148 using a modem (not shown). The external cloud server 146 may include one or more servers or computers connected via various types of wired or wireless networks (e.g. the Internet). It is noted that the term cloud is used as a general term throughout the present disclosure and may refer to any cloud-based services involving multiple servers, computers, devices and the like. External cloud server 146 collects vehicle data and analyzes the data to determine adaptive charge settings, which may be varied to achieve a selected or predetermined goal. External cloud server 146 may use any processing strategies including artificial intelligence (AI), machine learning, neural networks, and the like to vary the adaptive charge settings. The present disclosure is independent of the particular strategies used to determine the adaptive charge settings.

The TCU 144 may be provided with a local non-volatile storage (not shown) configured to record and store TCU configuration data 150 for the TCU 144. The configuration data 150 may include various data related to the settings of the TCU 144. As a few non-limiting examples, the configuration data 150 may include an identification, network settings to connect to the cloud 146, data package subscriptions, notification preference, vehicle identification data, vehicle battery charge setting compatibility data, or the like.

The ECUs 140 may further include a powertrain control module (PCM) 152 configured to monitor and control the powertrain operation of the vehicle 102. For example, the PCM 152 may be configured to control operation of at least one electric motor to provide propulsive power to the vehicle. Settings and user preferences may be stored in a local storage as PCM configuration data for the PCM 152. In embodiments of electrified vehicles having a step-ratio transmission, PCM 152 may control a shift schedule or shift feel of the transmission.

The ECUs 140 may further include a body control module (BCM) 154 configured to monitor and control chassis or body operations of the vehicle 102. For example, the BCM 154 may be configured to control and monitor vehicle body functions such as door lock/unlock, vehicle occupancy, blind spot monitoring or the like using signals detected via one or more sensors (not shown). Similarly, configurations for the BCM 154 may be stored as BCM configuration data (not shown) in the BCM 154.

The ECUs 140 may further include electronic stability controls (ESC) 156 configured to monitor vehicle operation status using signals from the speed sensor (not shown) and control the stability of the vehicle operation whenever needed such as by activating anti-lock brakes (ABS), traction controls or the like based on the selected vehicle profile. Configurations and settings of the ESC 156 may be stored as ESC configuration data in locally in a non-volatile storage medium. The ECUs 140 may further include an autonomous driving controller (ADC) 158 configured to monitor and control the autonomous driving features of the vehicle 102, which may vary based on the particular application and/or the selected vehicle profile. Autonomous driving features may include lane keep assist, distance from other vehicles, adaptive cruise control, hands-off-wheel alert, autobraking, brake mitigation with multiple sensitivity levels or the like. Configurations and settings of the ADC 158 may be stored as ADC configuration data in a non-volatile storage medium.

Figure 2:
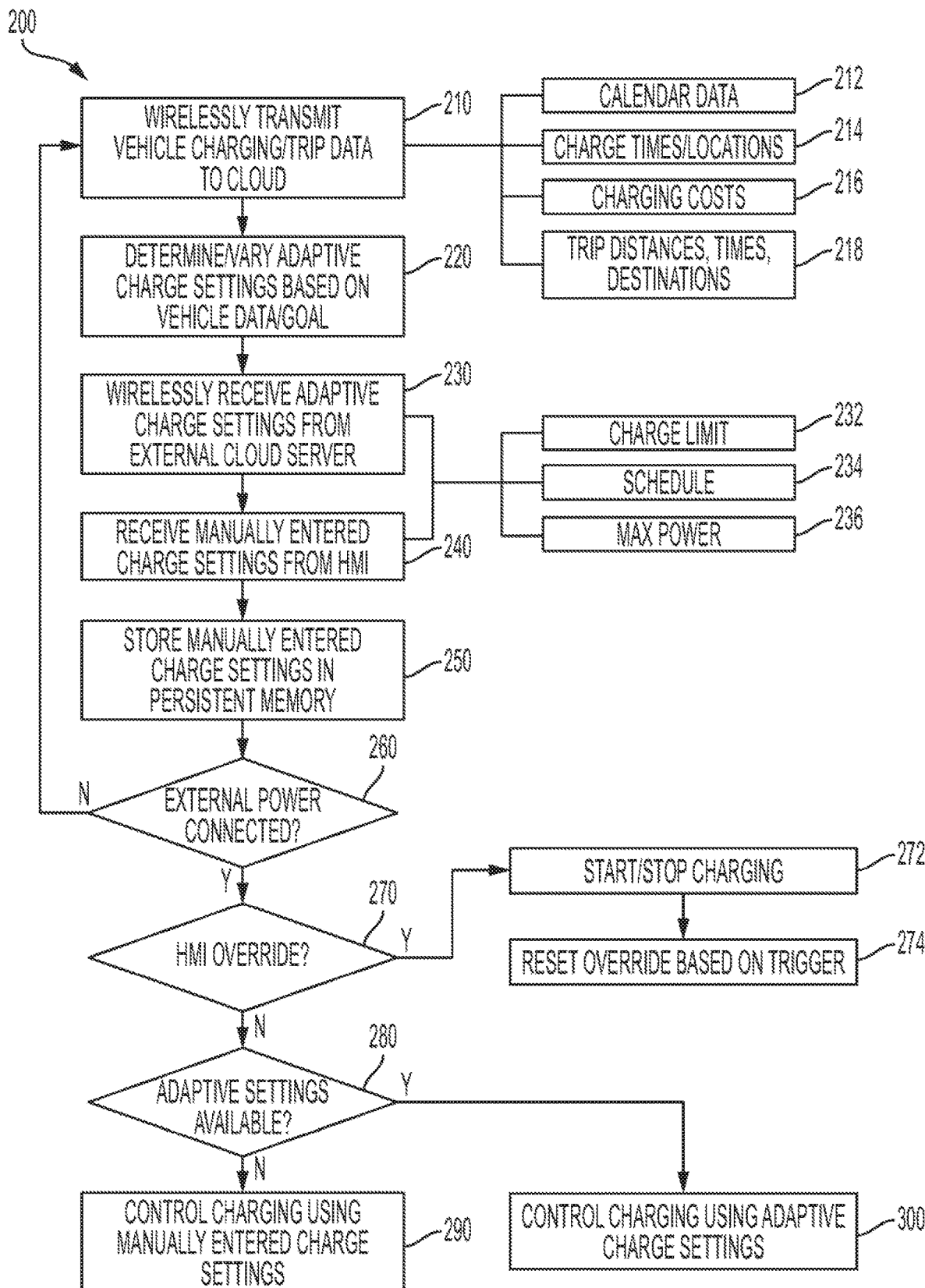
FIG. 2 illustrates operation of a system, method, or vehicle for overriding on-board electrified vehicle charge settings with adaptive charge settings from an external source according to one or more embodiments.

The vehicle 102 may be further provided with a battery electronic control module (BECM) 160 to control cell balancing, charging, discharging, and other operations of a vehicle traction battery (FIG. 2). BECM 160 may be connected to the in-vehicle network 142 and configured to communicate with various ECUs 140 of the vehicle 102 and collect data therefrom. The BECM 160 may be connected to the in-vehicle network 142 via a connecting port such as an OBD-II connector (not shown). Alternatively, the one or more ECUs 140, including BECM 160 may be integrated with the computing platform 104 and communicate with the in-vehicle network 142 directly. In one embodiment, BECM 160 controls charging of traction battery 101 in response to detecting connection of the electrified vehicle to an external power source by controlling charging of the vehicle using manually entered on-board charging settings 108 stored in persistent memory in response to adaptive charging settings from external cloud server 146 being unavailable. BECM 160 may also control charging of the electrified vehicle 102 to stop charging in response to receiving a corresponding input from the HMI 112. BECM 160 may also be configured to switch between the adaptive traction battery charging settings 170 and the manually entered traction battery charging settings 108 in response to input received from the HMI 112. In one embodiment, BECM 160 is configured to control the vehicle charger 103 to deactivate both the adaptive traction battery charging settings 170 and the manually entered traction battery settings 108 and to start charging in response to the input received from the HMI 112.

The ECUs 140 may further include a dedicated short-range communication (DSRC) controller 162 configured to wirelessly communicate with compatible controllers of other vehicles or digital entities.

Similar to the manually entered charge settings 108, the advanced or adaptive charge settings 170 may include configurations associated with various controllers. In some embodiments, different charge settings may be provided by adaptive charge settings 170 that are not available in the manually entered charge settings 108. The particular charge settings 108, 170, as well as the one or more controllers that may be used to implement the charge settings 108, 170, may vary by application and implementation. As a few non-limiting examples, charge settings 108, 170 may include PCM profile or configuration data including settings of the PCM 152, BCM 154, and/or BECM 160.

As generally illustrated in FIG. 1, an electrified vehicle 102 according to one or more embodiments includes a traction battery 101 configured to be charged from an external power source via a vehicle charger 103, a transceiver 130 configured to wirelessly transmit vehicle data to an external cloud server 146 and to wirelessly receive adaptive traction battery charging settings 170 from the external cloud server 146. An override interface module 124 is configured to selectively override control of the vehicle charger 103 based on the adaptive traction battery charging settings 170 wirelessly received via the transceiver 130 from the external cloud server 146. Override interface module 124 may be implemented as software and/or hardware depending on the particular application and implementation.

As also shown in FIG. 1, a human-machine interface (HMI) 112 may be used to manually enter on-board traction battery charging settings 108 that are stored in persistent memory 110. A controller 140 in communication with persistent on-board vehicle memory 110, the vehicle charger 103, the override interface module 124, and the HMI 112 is configured to receive the manually entered traction battery charging settings 108 via the HMI 112, store the manually entered traction battery charging settings 108 in the persistent on-board vehicle memory 110, and selectively control the vehicle charger 103 using the manually entered traction battery charging settings 108 in response to the adaptive traction battery charging settings 170 being unavailable. External cloud server 146 may vary the adaptive traction battery charging settings 170 based on historical traction battery charging data received by the external cloud server 146 from the electrified vehicle 102. The adaptive traction battery charging settings 170 may vary based on historical vehicle trip data received by the external server 146 from the electrified vehicle 102. In various embodiments, the controller 140 is configured to switch between the adaptive traction battery charging settings 170 and the manually entered traction battery charging settings 108 in response to input received from the HMI 112. The controller 140 may also be configured to control the vehicle charger 103 to stop charging in response to the input received from the HMI 112, and/or to control the vehicle charger 103 to deactivate both the adaptive traction battery charging settings 170 and the manually entered traction battery charging settings 108 and to start charging in response to detecting connection to an external power source (by plug or contactless charging) and in response to the input received from the HMI 112 that selects immediate or on-demand charging. In one or more embodiments, the controller 140 is configured to reactivate either the adaptive traction battery charging settings 170 or the manually entered traction battery charging settings 108 in response to disconnection of the electrified vehicle 102 from the external power source.

As previously described, the manually entered traction battery charging settings 108 and the adaptive traction battery charging settings 170 may include various charging settings depending on the particular application and implementation. Representative charging settings may include a traction battery charging target less than a maximum traction battery capacity, a schedule for traction battery charging, and charging power costs associated with charging during each of a plurality of time periods, for example. In at least one embodiment, the controller 140 controller is configured to receive the adaptive traction battery charging settings 170 from the external cloud server 146 via handheld mobile device 126 coupled to the transceiver 130.

FIG. 2 provides a simplified schematic diagram illustrating operation of a representative embodiment of a system or method for controlling electrified vehicle charging according to the disclosure. The illustrated steps or functions may be performed by hardware and/or software that may include one or more electric or electronic circuits, one or more programmed microprocessors or controllers and various supporting components of the vehicle and/or external cloud server as will be appreciated by those of ordinary skill in the art. Various steps or functions may be repeated whether or not specifically illustrated. Similar, various steps or functions may be performed in a different order than illustrated or may be omitted in some applications or implementations.

As generally represented in FIG. 2, system or method 200 may be used to control charging of an electrified vehicle having a traction battery and may include wirelessly transmitting vehicle data to an external cloud server as represented at 210. The vehicle data may include calendar data 212, vehicle charging times and/or locations 214, charging costs 216, and/or trip distances, time, destinations, etc. 218, for example. Charging costs may include utility costs for each of a plurality of time periods and schedules, such as winter/summer and peak, off-peak, economy, holiday, etc. Charging costs may also include charging network subscriptions or public/private charging locations, such as a work location, for example. The external cloud server(s) may determine and subsequently adapt, change, modify, vary, etc. adaptive charge settings to meet a particular goal as represented at 220. The goal may be selected by the user in some embodiments, or may be specified by a fleet owner, manufacturer, ride share service, etc. depending on the particular implementation. The external cloud server(s) may employ various techniques or strategies to determine the adaptive charge settings to achieve one or more stated or selected goals based on learning the driving and charging behavior of the electrified vehicle including machine learning, artificial intelligence, neural network, and the like.

The system or method may include wirelessly receiving adaptive charging settings from the external cloud server(s) as represented at 230 and receiving manually entered charging settings from a human-machine interface (HMI) as represented at 240. The adaptive charge settings may control features that are a superset, subset, or the same as features controlled by the manually entered charge settings, and vice versa, depending on the particular application and implementation. In the representative embodiment illustrated in FIG. 2, the adaptive and manually entered charge settings are the same and may include a charging limit 232 less than maximum charging (such as a percentage of maximum capacity or a selected power level or distance to depletion, for example), a schedule 234 (such as dates/times to allow charging, preferred charging, no charging, immediate charging, etc.), and a maximum power 236 (such as a total charging power, maximum charging rate, etc.). Other charge settings may be provided depending on the particular implementation.

The system or method may also include storing the manually entered charging settings in a persistent memory of the electrified vehicle as represented at 250, and in response to detecting connection of the electrified vehicle to an external power source as represented at 260, controlling charging of the vehicle by a vehicle controller using the manually entered charging settings as represented at 290 in response to the adaptive charging settings being unavailable as represented at 280. If adaptive settings are available as indicated at 280, the system or method may control charging using the adaptive charge settings as indicated at 300. In one or more embodiments, the system or method may provide the ability to temporarily override or disable both the manually entered charge settings stored in memory and any adaptive charge settings received from an external cloud server in response to HMI input as indicated at 270. In one embodiment, HMI input may be used to override programmed/saved charge settings to start or stop charging as represented at 272. Any temporary override may be reset based on a trigger condition as represented at 274. For example, a trigger condition may be occurrence of the next scheduled charging time, elapsed time from receiving the override request, completing of a charging cycle, connection disconnection from an external power source, etc.

While representative embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the claimed subject matter that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electrified vehicle, comprising:
    a traction battery configured to be charged from an external power source via a vehicle charger;
    a transceiver configured to wirelessly transmit vehicle data to an external server and to wirelessly receive adaptive traction battery charging settings from the external server via a handheld mobile device coupled to the transceiver;
    an interface module configured to selectively override control of the vehicle charger based on the adaptive traction battery charging settings wirelessly received via the transceiver from the external server;
    a human-machine interface (HMI); and
    a controller in communication with a persistent on-board vehicle memory, the vehicle charger, the interface module, and the HMI, the controller configured to receive manually entered traction battery charging settings via the HMI, store the manually entered traction battery charging settings in the persistent on-board vehicle memory, and selectively control the vehicle charger using the manually entered traction battery charging settings in response to the adaptive traction battery charging settings being unavailable.

2. The electrified vehicle of claim 1 wherein the adaptive traction battery charging settings vary based on historical traction battery charging data received by the external server from the electrified vehicle.

3. The electrified vehicle of claim 2 wherein the adaptive traction battery charging settings vary based on historical vehicle trip data received by the external server from the electrified vehicle.

4. The electrified vehicle of claim 1 wherein the controller is configured to switch between the adaptive traction battery charging settings and the manually entered traction battery charging settings in response to input received from the HMI.

5. The electrified vehicle of claim 4 wherein the controller is configured to control the vehicle charger to stop charging in response to the input received from the HMI.

6. The electrified vehicle of claim 4 wherein the controller is configured to control the vehicle charger to deactivate both the adaptive traction battery charging settings and the manually entered traction battery charging settings and to start charging in response to the input received from the HMI.

7. The electrified vehicle of claim 6 wherein the controller is configured to reactivate either the adaptive traction battery charging settings or the manually entered traction battery charging settings in response to disconnection of the electrified vehicle from the external power source.

8. The electrified vehicle of claim 1 wherein the manually entered traction battery charging settings and the adaptive traction battery charging settings comprise one or more of a traction battery charging target less than a maximum traction battery capacity, a schedule for traction battery charging, and charging power costs associated with charging during each of a plurality of time periods.

9. A method for controlling charging of an electrified vehicle having a traction battery, comprising:
    wirelessly receiving adaptive charging settings from an external server via a handheld mobile device coupled to the electrified vehicle;
    receiving manually entered charging settings from a human-machine interface (HMI);
    storing the manually entered charging settings in a persistent memory of the electrified vehicle; and
    in response to detecting connection of the electrified vehicle to an external power source, controlling charging of the vehicle by a vehicle controller using the manually entered charging settings in response to the adaptive charging settings being unavailable.

10. The method of claim 9 further comprising controlling charging of the electrified vehicle by the vehicle controller to stop charging the electrified vehicle in response to receiving a corresponding input from the HMI.

11. The method of claim 9 further comprising controlling charging of the electrified vehicle to override the manually entered charging settings and the adaptive charging settings and start charging in response to a corresponding input from the HMI.

12. The method of claim 9 further comprising varying the adaptive charging settings in response to historical charging data and historical trip data of the electrified vehicle.

13. The method of claim 12 further comprising transmitting charging data and trip data from the electrified vehicle to the external server.

14. The method of claim 9 further comprising:
- receiving calendar data from the handheld mobile device coupled to the electrified vehicle;
- transmitting the calendar data from the electrified vehicle to the external server; and
- varying the adaptive charging settings based on the calendar data.

15. The method of claim 9 wherein the adaptive charging settings comprise one or more of a traction battery charging target less than a maximum traction battery capacity, a schedule for charging, and charging power costs associated with charging during each of a plurality of time periods.

16. A system for controlling electrified vehicle charging, comprising:
- a traction battery configured to be charged from an external power source via a vehicle charger;
- a transceiver configured to wirelessly transmit vehicle data to an external server and to wirelessly receive adaptive traction battery charging settings from the external server;
- an interface module configured to selectively override control of the vehicle charger based on the adaptive traction battery charging settings wirelessly received via the transceiver from the external server;
- a human-machine interface (HMI);
- a controller in communication with a persistent on-board vehicle memory, the vehicle charger, the interface module, and the HMI, the controller configured to receive manually entered traction battery charging settings via the HMI, store the manually entered traction battery charging settings in the persistent on-board vehicle memory, and selectively control the vehicle charger using the manually entered traction battery charging settings in response to the adaptive traction battery charging settings being unavailable;
- a server configured to receive electrified vehicle charging data and electrified vehicle trip data and to vary adaptive electrified vehicle charging settings in response thereto, and to selectively transmit the adaptive electrified vehicle charge settings to the electrified vehicle for use by the controller of the electrified vehicle to selectively control the vehicle charger; and
- a mobile device configured to receive the adaptive traction battery charging settings from the external server and to transmit the adaptive traction battery charging settings to the transceiver.

17. The system of claim 16 wherein the controller is configured to switch between the adaptive traction battery charging settings and the manually entered traction battery charging settings in response to input received from the HMI.

18. The system of claim 16 wherein the controller is configured to control the vehicle charger to deactivate both the adaptive traction battery charging settings and the manually entered traction battery settings and to start charging in response to the input received from the HMI.

* * * * *